United States Patent Office 3,495,164
Patented Feb. 10, 1970

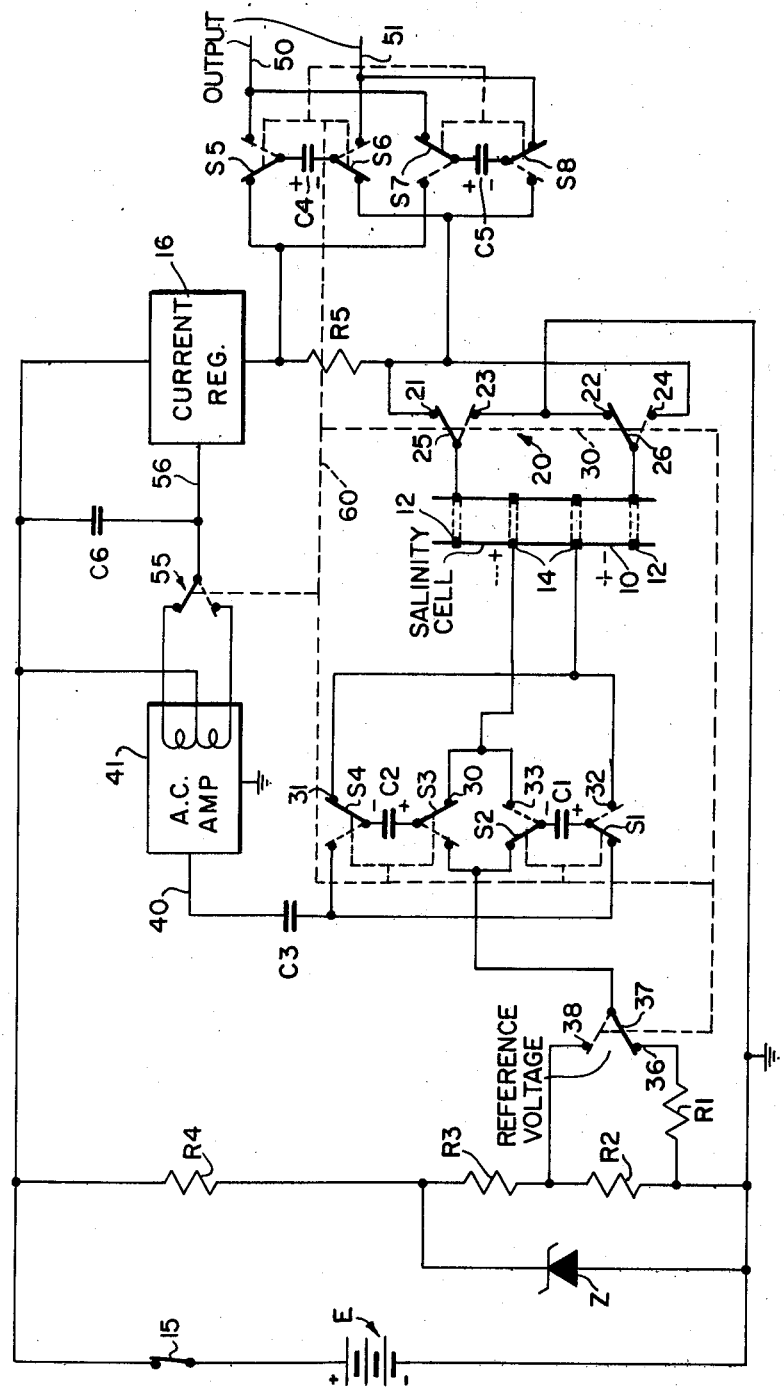

3,495,164
CONDUCTIVITY MEASUREMENT APPARATUS
Thomas M. Dauphinee, 36 Avenue Road,
Ottawa, Ontario, Canada
Filed Feb. 2, 1968, Ser. No. 702,577
Int. Cl. G01r 11/44
U.S. Cl. 324—30                                    8 Claims

ABSTRACT OF THE DISCLOSURE

Apparatus for measuring the conductivity of a liquid. A source of DC current is chopped to provide square wave current which is passed through a cell containing a sample of the liquid. Voltages developed across potential electrodes in the cell are sampled by first and second capacitors alternately connected across them and compared with a reference voltage which is also reversed so that any unbalance appears as an AC signal. This signal is amplified, synchronously demodulated, and filtered to obtain a DC signal which is then used to control the current supplied by a current regulator, which current passes through the cell. The voltage across a reference resistor in series with this current is measured to provide an indication of the conductivity of the liquid in the cell.

BACKGROUND OF THE INVENTION

This invention relates to apparatus for measuring the conductivity of a liquid, e.g. sea water.

The present invention was primarily developed for use in oceanographic surveys but is also useful in other applications where it is desired to know the conductivity of a liquid. In oceanographic surveys it is frequently desired to chart, inter alia, the salinity of water in various regions and depths. Since salinity is related to conductivity, one can measure the conductivity of water in order to determine its salinity. The apparatus according to the invention, which may be incorporated in an overall system for measuring sea water temperature, pressure and salinity, may be lowered into the sea on the end of a long cable while a recording device remains on board ship and is connected thereto via the cable. The recorder may be designed to record a number of variables such as temperature, pressure and salinity (conductivity) but, for the purposes of the present disclosure, only the recording of conductivity need be considered.

Conductivity measurements utilizing DC current are inaccurate because of polarization effects at the electrodes. To avoid this, it is known to use 5–10 kc. alternating current. However, difficulties may be encountered because of phase shifts in the AC system or in accurately regulating such alternating current thereby causing variations in recordings which give incorrect conductivity readings.

SUMMARY OF INVENTION

The present invention avoids the above difficulties by using a regualted source of DC current and by electrically isolating the measuring circuitry from the recording circuitry. The regulated DC current is mechanically "chopped" to povide a square wave comprising positive and negative pulses which are fed to current electrodes of a hollow elongated sampling cell adapted to receive a sample of the liquid of which the conductivity is to be measured. Thus, the sampling cell is supplied with regualted square wave current which eliminates the effects of polarization at the current electrodes. The DC current passes through a current regulator and a reference resistor. The voltages developed across potential electrodes, disposed intermediate the current electrodes of the sampling cell, are periodically sampled by means of first and second capacitors alternately connected across them. The system is essentially a conductivity measurement, in that the voltage across the cell is maintained constant and the current required to maintain this voltage at its fixed value is used as a measure of the conductivity. The cell voltage is compared with a reference voltage which is also reversed so that any unbalance appears as an AC signal. This signal is fed to an amplifier, the output of which is synchronously demodulated, and filtered to obtain a DC signal which is then used to control the current supplied by the current regulator. This current, as mentioned above, passes through a reference resistor, e.g. 100Ω, and the signal sent up the cable to the deck measuring unit is the voltage across it. This voltage is transferred by another set of capacitors so that the cable signal is electrically isolated from the sea water. This is important because the sampling cell is grounded to the ocean but the measuring unit or recording device, which may be up to a mile away, is grounded to the ship. Because of polarization and current reversal at the cell, the voltage of the measuring unit moves up and down with respect to the cable and it would be impossible to transmit this up a long cable.

In the preferred embodiment, instead of actually reversing the reference voltage, a chopper contact is switched from one side to the other of a reference voltage which is grounded in order to provide a square wave voltage. The amplifier is provided with an input capacitor which acts as a blocking capacitor which prevents DC or slowly changing polarization voltages from being transferred to the measuring unit. Rapidly changing polarization voltages will not occur at the potential electrodes because negligible current is being drawn from them.

According to the present invention there is provided apparatus for measuring the conductivity of a liquid comprising a hollow elongated sampling cell adapted to receive samples of said liquid and having a pair of spaced potential electrodes intermediate said current electrodes. A source of direct current is connected in series with a current regulator, a reference resistor and the current electrodes through a device for periodically reversing the connections of said current electrodes with respect to said source whereby the current through the cell is substantially a square wave comprising positive and negative pulses. Means are provided for sampling the voltage between the potential electrodes during the positive and negative pulses; for comparing the voltage between said potential electrodes with a reference square wave voltage and for detecting if the voltage across the potential electrodes differs from a predetermined relationship with the reference square wave voltage and for thereby producing an output voltage. The output voltage is adapted to control the current regulator so as to maintain the voltage between the potential electrodes at a constant value and means are provided for sampling the voltage across the reference resistor, said voltage being proportional to the conductivity of the liquid.

BRIEF DESCRIPTION OF THE DRAWING

The sole figure of the drawing is a partly block, partly schematic, diagram of an embodiment according to the invention showing the alternate positions of the various switch arms by solid and dotted lines respectively.

Referring to the drawing, it may be seen that the apparatus according to the invention comprises a hollow elongated sampling cell 10 adapted to receive a sample of a liquid and having a pair of ring-like spaced current electrodes 12 and a pair of ring-like spaced potential electrodes 14 intermediate the current electrodes 12.

Current is supplied to the current electrodes 12 by a suitable source, such as a battery E, via an on-off switch 15, a current regulator 16, a reference resistor R5 and the reversing switch 20 having a pair of stationary upper contacts 21 and 22, a pair of stationary lower contacts 23 and 24, and a pair of movable contacts 25 and 26, the movable contacts 25 and 26 being ganged as indicated by the dashed line 30. With movable contacts 25 and 26 in the solid line positions shown in the drawing, it is readily apparent that current flows downwards through cell 10 so that the voltage across the potential electrodes 14 has the polarity shown by the solid plus and minus symbols. With movable contacts 25 and 26 in the dotted line positions shown in the drawing, current flows upwards through the cell 10 so that the voltage across potential electrodes 14 is reversed and has the polarity shown by the dotted plus and minus symbols. Current downward through cell 10 is, for the purposes of this disclosure, termed "positive" while current upwards through cell 10 is termed "negative." Switch arms 25 and 26 are synchronously moved back and forth between the upper and lower positions shown in the drawing at a fairly rapid rate such as 10–80 cycles per second, the exact frequency not being critical. In this way the current through the cell 10 is periodically reversed whereby the current through the cell 10 is substantially a square wave comprising positive and negative pulses.

The voltage across potential electrodes 14 is alternately sampled by means comprising a pair of capacitors C1 and C2. When current through cell 10 is positive, capacitor C2 is connected across potential electrodes 14 by means of switch arms S3 and S4 connected to stationary contacts 30 and 31 respectively, as shown in solid lines in the drawing. When current through cell 10 is negative capacitor C1 is connected across potential electrodes 14 by switch arms S1 and S2 connected to stationary contacts 32 and 33 respectively, as shown in dotted lines in the drawing.

When the current through cell 10 is positive, capacitor C1 is connected (solid lines) in a series circuit which may be traced from ground through current limiting resistor R1, stationary contact 36, movable contact 37, capacitors C1 and C3 the input 40 of amplifier 41 and back to ground. Assuming C3 is uncharged and that C1 was charged by having previously been connected across potential electrodes 14, it will be seen that capacitor C1 will tend to discharge and hence charge up capacitor C3 until C1 and C3 have equal but opposite voltages. However, during normal operation, capacitor C3 will have some charge and hence will affect the discharging of capacitor C1. A more complete explanation of normal circuit operation will be given subsequently herein.

When current through cell 10 is negative capacitor C2 is connected (dotted lines) in a series circuit which may be traced from ground through resistor R2, stationary contact 38, movable contact 37 (now in upper position), capacitor C2, capacitor C3, input 40 of amplifier 41 and back to ground. Assuming C3 is initially uncharged and that the capacitor C2 was previously charged to the polarity shown by having been connected across electrodes 14, it will be seen that the voltage across C2 opposes the voltage across resistor R2. If the voltage across resistor R2 is greater than the voltage across capacitor C2, C2 will begin to discharge while C3 will begin to charge. The significance of these results will become clearer subsequently.

It will be noted that the battery E is connected in series with resistors R2, R3 and R4 and that a Zener diode Z is connected in parallel with the series combination of R2 and R3. The voltage across resistor R2 is a reference voltage which is maintained substantially constant by Zener diode Z.

The circuit stabilizes quickly after start-up, i.e. after switch 15 is closed. If the voltage across the potential electrodes 14 of the cell 10 is plus or minus $V_c$ and the voltage across R2 is $2V_c$, capacitor C3 will, after a few cycles, reach a voltage of $V_c$ and will not fluctuate as capacitors C1 and C2 are alternately switched between the connections shown by the solid and dotted lines, respectively. That is the circuit is in balance when the voltage across the resistor R2 is twice the voltage $V_c$ between the potential electrodes 14. This may be seen as follows:

Assume that the various switch arms are in the dotted line positions when switch 15 is initially closed. Capacitor C2 is initially uncharged, as is capacitor C3, but they both quickly assume a voltage of $V_c$, i.e. they are each charged to voltage $V_c$ by the reference voltage $2V_c$ across resistor R2. Meanwhile, capacitor C1 assumes a voltage of $V_c$ by virtue of being connected across the potential electrodes 14, the polarity being as shown in the drawing. Now, when the circuit assumes the condition shown in solid lines, capacitor C1 is connected in series with capacitor C3 but with opposite polarity so that no current flows and C3 and C1 both remain charged to the voltage $V_c$. Upon again switching back to the condition shown in dotted lines, the reference voltage $2V_c$ is connected in series with C1 and C3 which both have a voltage of $V_c$ with the same polarity with respect to each other but of opposite polarity with respect to that of the reference voltage of $2V_c$. Therefore, again, no current flows and hence balance has been achieved. That is, C3 maintains a constant voltage and hence the input to the amplifier 41 is constant. The amplifier output is thus constant and this output is applied to the input of the current regulator 16 so that it maintains the current through reference resistor R5, and hence through cell 10, at a constant value which may be taken as a reference value. The circuit may be calibrated by filling the cell 10 with a sample of liquid of which the conductivity is known.

If switch 15 is closed when the various other switches are in the solid line positions, balance is not achieved quite as quickly but nevertheless is achieved after several cycles which, even at as low a frequency as 10 cycles per second, involves only a short time.

The voltage across reference resistor R5 is sampled by a pair of capacitors C4 and C5 which, by means of switch arms S5, S6 and S7 respectively, are alternately connected across resistor R5 and across a pair of output leads 50 and 51 forming part of a cable leading to recording or measuring equipment, e.g. equipment on board ship. Capacitors C4 and C5 are connected as shown to leads 50 and 51 so that they are supplied with substantially direct current.

If the voltage across the cell 10 differs from $V_c$ an imbalance occurs with the result that the voltage on capacitor C3 varies up and down during each half cycle. That is, an AC voltage variation is superimposed on C3 so that its voltage rises (or falls) when the switches are in the solid line positions and falls (or rises) when the switches are in the dotted line positions. This AC variation is amplified by amplifier 41, mechanically rectified or demodulated by a chopper 55 connected to the center-tapped output of amplifier 41, filtered by capacitor C6 and applied to control terminal 56 of current regulator 16 to vary the current flowing therethrough and through resistor R5 and cell 10. The current is increased or decreased as necessary by current regulator 16 so that balance is again achieved. The increased or decreased current increases or decreases the voltage across resistor R5 and this increased or decreased voltage is transmitted to leads 50 and 51 by capacitors C4 and C5.

A deviation from balance can be caused by an increase or decrease in conductivity of the liquid sample from a reference value. This deviation is measured by measuring the voltage variation across resistor R5 as described above.

As an example, let it be assumed that the circuit is initially in balance, i.e. that the voltage across R2 equals $2V_c$, $V_c$ being the voltage between the potential electrodes 14 of cell 10. Also, assume the various switches are in the positions shown in solid lines. Then assume that the voltage across the cell 10 increases by $\Delta V_c$ volts.

Obviously, this will cause the voltage across C2 to also increase by $\Delta V_c$ volts to a voltage of $V_c + \Delta V_c$.

Immediately upon changeover to the dotted line switch positions, the reference voltage $2V_c$ will be opposed by the voltage of C2, i.e. $(V_c + \Delta V_c)$ and the voltage of C3 (still unchanged from $V_c$, the voltage it had at balance). The sum of the voltages of C2 and C3 is greater by $\Delta V_c$ than the voltage of the reference $(2V_c)$ so that C2 will discharge to $V_c + \frac{1}{2}\Delta V_c$ and C3 will discharge to $V_c - \frac{1}{2}\Delta V_c$, whereat the sum of the voltages across C2 and C3 equals the reference voltage $2V_c$.

Immediately upon switch over again to the switch positions shown in solid lines, the voltage on C2 is $V_c + \Delta V_c$ and the voltage on C3 is $V_c - \frac{1}{2}\Delta V_c$. That is, the voltage across C1 exceeds the voltage across C3 and, since they oppose each other, C1 will tend to discharge and C3 to charge until their voltages are equal and opposite, viz. $V_c + \frac{1}{4}\Delta V_c$.

Immediately upon switch over again to the switch positions shown in dotted lines, the voltage on C2 is $V_c + \Delta V_c$ and that on C3 is $V_c + \frac{1}{4}\Delta_c$. These voltages, in series aiding, are opposed by the reference voltage of $2V_c$ and, as their combined voltage exceeds the reference voltage, they discharge until their combined voltages equal that of the reference voltage. This can be shown to occur when the voltage across C2 is $V_c + \frac{3}{8}\Delta V_c$ and that across C3 is $V_c - \frac{3}{8}\Delta V_c$.

Immediately upon reverting to the switch positions shown in solid lines again, the voltage on C1 is, of course, $V_c + \Delta V_c$ and that across C3 $V_c - \frac{3}{8}V_c$. C1 charges C3 until they have equal (but opposite) voltages which occurs when they each have a voltage of $V_c + \frac{5}{16}\Delta V_c$.

Immediately upon switching back to the switch positions indicated by dotted lines the voltage on C2 is $$V_c + \Delta V_c$$

and that across C3 is $V_c + \frac{5}{16} V_c$. C2 and C3 again discharge until the voltage on C2 is $V_c + \frac{11}{32}\Delta V_c$ and the voltage across C3 is $V_c - \frac{11}{32}\Delta V_c$.

Immediately upon switching to the switch positions shown in solid lines again, the voltage on C1 is $V_c + \Delta V_c$ and that acoss C3 is $V_c - \frac{11}{32}\Delta V_c$. C1 charges C3 until they both have a voltage of $V_c + \frac{21}{64}\Delta V_c$.

This could be carried further but it should be evident now that the voltage variations across C3 are rapidly tending to limits; viz $V_c \pm \frac{1}{3}\Delta V_c$.

For purposes of simplifying the above analysis, it was assumed that C1, C2 and C3 had equal capacitances and it was also assumed that the voltage across the potential electrodes 14 remained constant at $V_c + \Delta V_c$ or, in other words, that the current regulator 16 made no adjustment while the voltage on C3 was adjusting from a constant value of $V_c$ volts (during balance) to a voltage varying between plus and minus $\frac{1}{3}\Delta V_c$.

The various switch arms may be ganged together as indicated by the dashed line 60. The switch arms may be operated by a mechanical chopper operating at 10–80, preferably 30–40 cycles per second, the exact frequency not being critical. The operating frequency of the chopper does not have to be held to within close limits. In order to avoid voltage transients being transmitted to amplifier 41, it is preferable that the connections to the cell 10 be reversed while the switch arms S1, S2, S3, S4 and S7 are open, i.e. in transit between sides so that the capacitors will not be connected when the cell voltage goes to zero.

A DC polarization voltage may be superimposed on the square wave component $V_c$ across $C_1$ and $C_2$. This will appear as a DC voltage on $C_3$ but as it is DC it will not affect the amplifier. In other words, a DC polarization effect is taken care of by the circuitry and will not result in a false output.

What I claim as my invention:

1. Apparatus for measuring the conductivity of a liquid comprising a hollow elongated sampling cell adapted to receive samples of said liquid and having a pair of spaced current electrodes and a pair of spaced potential electrodes intermediate said current electrodes; a source of direct current in series with a current regulator, a reference resistor and said current electrodes through a device for periodically reversing the connections of said current electrodes with respect to said source whereby the current through said cell is substantially a square wave comprising positive and negative pulses; means for sampling the voltage between said potential electrodes during said positive and negative pulses; means for comparing the voltage between said potential electrodes with a reference square wave voltage; detecting means for detecting if the voltage across said potential electrodes differs from a predetermined realtionship with the reference square wave voltage and for thereby producing an output voltage, said output voltage being adpated to control said current regulator so as to maintain the voltage between said potential electrodes at a constant value; and means for sampling the voltage across said reference resistor, said voltage being proportional to the conductivity of said liquid.

2. Apparatus as claimed in claim 1 wherein said means for sampling the voltage between said potential electrodes during said positive and negative pulses comprises first and second capacitors and first and seocnd switching means, said first and second switching means alternately connecting said first and second capacitors across said potential electrodes.

3. Apparatus as claimed in claim 2 wherein said means for comparing the voltage between said potential electrodes with the reference square wave voltage comprises means for alternately connecting a third capacitor in a first series circuit comprising ground, a current limiting resistor, said first capacitor, said third capacitor, the input of an AC amplifier, and back to ground, and in a series circuit comprising ground, a reference DC voltage, said second capacitor, said third capacitor, the input of said AC amplifier and back to ground.

4. Apparatus as claimed in claim 3 wherein said detecting means comprises said AC amplifier.

5. Apparatus as claimed in claim 4 wherein the output of said AC amplifier is substantially a square wave comprising positive and negative pulses and means are provided for alternately connecting a fourth capacitor in opposite directions across the output of said AC amplifier during the positive and negative pulses of the output of said AC amplifier whereby said fourth capacitor is charged by pulsating direct current.

6. Apparatus as claimed in claim 5 wherein the voltage across said fourth capacitor is adapted to control said current regulator.

7. Apparatus as claimed in claim 1 wherein the means for sampling the voltage across said resistor comprises a pair of capacitors and switching means for alternately connecting each capacitor of said pair of capacitors across said resistor and across a pair of output leads, said switching means connecting each capacitor of said pair of capacitors across said resistor and across said pair of output leads with a common polarity so that said pair of output leads is supplied with unidirectional current.

8. Apparatus as claimed in claim 3 wherein said reference DC voltage is derived across a resistor connected in series with a DC source and in parallel with a Zener diode.

References Cited
UNITED STATES PATENTS
2,871,445   1/1959   Carter et al. _____ 324—64 X
2,871,446   1/1959   Wann _____ 324—64

ARCHIE R. BORCHELT, Primary Examiner
C. F. ROBERTS, Assistant Examiner

U.S. Cl. X.R.

324—64